United States Patent
Suzuki

(10) Patent No.: US 12,307,703 B2
(45) Date of Patent: May 20, 2025

(54) DETECTION DEVICE AND DETECTION METHOD

(71) Applicant: FANUC CORPORATION, Yamanashi (JP)

(72) Inventor: Tadanori Suzuki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 72 days.

(21) Appl. No.: 18/015,344

(22) PCT Filed: Jul. 8, 2021

(86) PCT No.: PCT/JP2021/025791
§ 371 (c)(1),
(2) Date: Jan. 10, 2023

(87) PCT Pub. No.: WO2022/014458
PCT Pub. Date: Jan. 20, 2022

(65) Prior Publication Data
US 2023/0281857 A1    Sep. 7, 2023

(30) Foreign Application Priority Data
Jul. 13, 2020  (JP) .................................. 2020-119653

(51) Int. Cl.
*G06T 7/70* (2017.01)
*B25J 9/16* (2006.01)
*H04N 23/695* (2023.01)

(52) U.S. Cl.
CPC .............. *G06T 7/70* (2017.01); *B25J 9/1664* (2013.01); *B25J 9/1697* (2013.01);
(Continued)

(58) Field of Classification Search
CPC .............. G06T 7/70; G06T 2207/10012; G06T 2207/30164; H04N 23/695; B25J 9/1664; B25J 9/1697
(Continued)

(56) References Cited

U.S. PATENT DOCUMENTS

| 10,692,204 B2 * | 6/2020 | Thompson .............. B29C 70/54 |
| 2017/0191822 A1 * | 7/2017 | Becker ....................... G06T 7/73 |
| 2018/0157230 A1 * | 6/2018 | Matsushima ...... G05B 19/4061 |

FOREIGN PATENT DOCUMENTS

| JP | S63072506 U | 5/1988 |
| JP | 2008139194 A | 6/2008 |

(Continued)

OTHER PUBLICATIONS

Written Opinion of the International Searching Authority issued by the Japanese Patent Office acting as the International Searching Authority in relation to International Application No. PCT/JP2021/025791 dated Sep. 7, 2021 (3 pages).

(Continued)

*Primary Examiner* — Stuart D Bennett
(74) *Attorney, Agent, or Firm* — Robert P. Michal, Esq.; Carter, DeLuca & Farrell LLP

(57) ABSTRACT

An imaging control unit of this detection device controls the imaging orientation of a three-dimensional camera such that one end of a workpiece enters the field of view of the three-dimensional camera, and then controls the imagining orientation of the three-dimensional camera such that the other end of the workpiece enters the field of view of the three-dimensional camera. A coordinate acquisition unit acquires the position coordinates of one end acquired by the three-dimensional camera from three-dimensional information pertaining to the one end, and acquires the position coordinates of another end acquired by the three-dimen- (Continued)

sional camera from three-dimensional information pertaining to the other end.

9 Claims, 11 Drawing Sheets

(52) U.S. Cl.
CPC . *H04N 23/695* (2023.01); *G06T 2207/10012* (2013.01); *G06T 2207/30164* (2013.01)

(58) Field of Classification Search
USPC .......................................................... 348/46
See application file for complete search history.

(56) References Cited

FOREIGN PATENT DOCUMENTS

| | | | |
|---|---|---|---|
| JP | 2008246631 | A | 10/2008 |
| JP | 2017207439 | A | 11/2017 |

OTHER PUBLICATIONS

International Search Report issued by the Japanese Patent Office acting as the International Searching Authority in relation to International Application No. PCT/JP2021/025791 dated Sep. 7, 2021 (3 pages) along with English language translation (2 pages).

\* cited by examiner

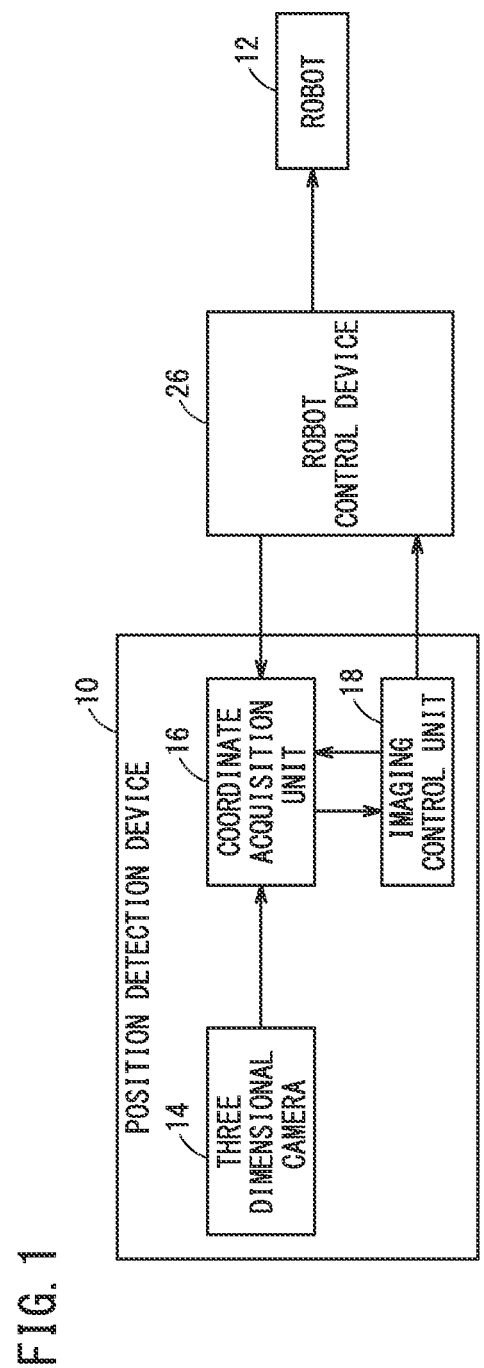

DETECTION DEVICE AND DETECTION METHOD

CROSS-REFERENCE TO RELATED APPLICATIONS

This application is a national phase entry under 35 U.S.C. 371 of PCT International Application No. PCT/JP2021/025791, filed Jul. 8, 2021, which claims priority to Japanese Patent Application No. 2020-119653, filed Jul. 13, 2020, the disclosure of each of these applications is expressly incorporated herein by reference in their entirety.

TECHNICAL FIELD

The present invention relates to a detection device and a detection method for detecting a position of a long workpiece.

BACKGROUND ART

A detection device and a detection method capable of detecting the positions of both ends of a long workpiece have been conventionally disclosed (see JP S63-072506 U, for example).

SUMMARY OF THE INVENTION

In order to detect the positions of both ends of a long workpiece, it is necessary to move the detection sensor to the vicinity of each of one end and another end of the long workpiece. Therefore, it takes time to detect the positions of both ends of the long workpiece.

The present invention has been devised in order to solve the above problem, and an object of the present invention is to provide a detection device and a detection method capable of reducing the time required for detecting the positions of both ends of a long workpiece.

According to a first aspect of the present invention, there is provided a detection device that detects a position of a long workpiece, the detection device comprising: a three dimensional camera which is configured to acquire three dimensional information, and an imaging direction of which is configured to be changed; an imaging control unit configured to control the imaging direction of the three dimensional camera; and a coordinate acquisition unit configured to acquire position coordinates of the long workpiece from the three dimensional information acquired by the three dimensional camera, wherein the imaging control unit changes the imaging direction of the three dimensional camera so that one end of the long workpiece enters a field of view of the three dimensional camera, and then changes the imaging direction of the three dimensional camera so that another end of the long workpiece enters the field of view of the three dimensional camera, and the coordinate acquisition unit acquires position coordinates of the one end from the three dimensional information of the one end acquired by the three dimensional camera when the imaging direction of the three dimensional camera is changed so that the one end enters the field of view of the three dimensional camera, and acquires position coordinates of the other end from the three dimensional information of the other end acquired by the three dimensional camera when the imaging direction of the three dimensional camera is changed so that the other end enters the field of view of the three dimensional camera.

According to a second aspect of the present invention, there is provided a detection method for detecting a position of a long workpiece based on three dimensional information acquired by a three dimensional camera, the detection method comprising: an imaging step of acquiring the three dimensional information by changing an imaging direction of the three dimensional camera so that one end of the long workpiece enters a field of view of the three dimensional camera and then acquiring the three dimensional information by changing the imaging direction of the three dimensional camera so that another end of the long workpiece enters the field of view of the three dimensional camera; and a coordinate acquisition step of acquiring position coordinates of the one end from the three dimensional information of the one end acquired by the three dimensional camera when the imaging direction of the three dimensional camera is changed so that the one end enters the field of view of the three dimensional camera, and acquiring position coordinates of the other end from the three dimensional information of the other end acquired by the three dimensional camera when the imaging direction of the three dimensional camera is changed so that the other end enters the field of view of the three dimensional camera.

According to the present invention, the time required for detecting the positions of both ends of the long workpiece can be reduced.

BRIEF DESCRIPTION OF DRAWINGS

FIG. 1 is a block diagram of a position detection device;

DETAILED DESCRIPTION OF THE INVENTION

First Embodiment

[Configuration of Coordinate Detection Device]

Figure 2A:
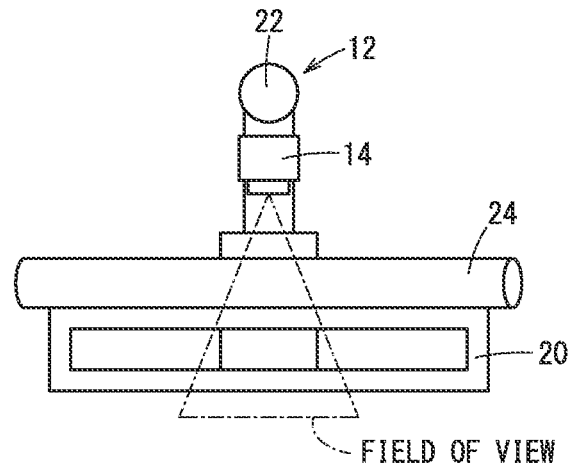
FIGS. 2A, 2B and 2C are diagrams each showing an articulated robot.
Figure 2B:
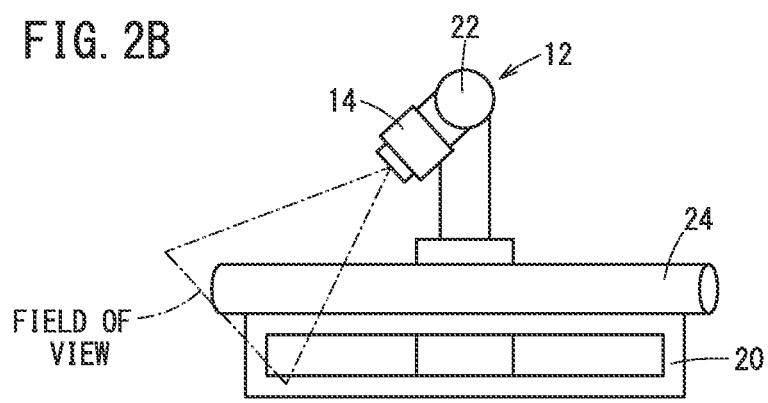
Figure 2C:
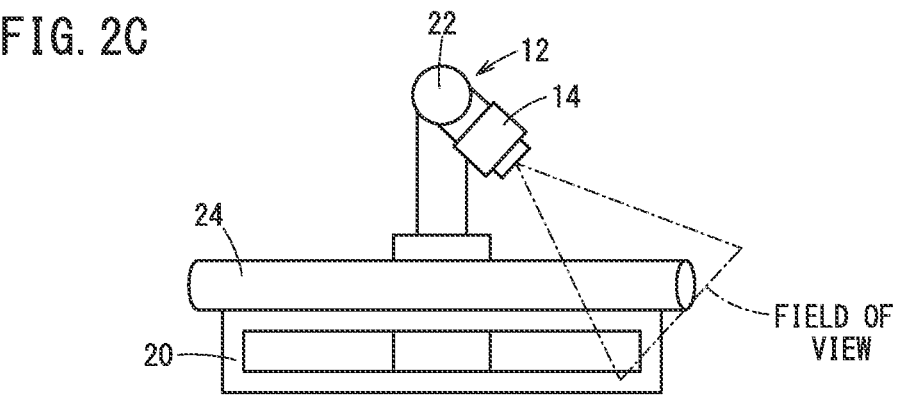

FIG. 1 is a block diagram of a position detection device 10. FIGS. 2A to 2C are diagrams each showing an articulated robot 12. The position detection device 10 includes a three dimensional camera 14, a coordinate acquisition unit 16, and an imaging control unit 18. The position detection device 10 corresponds to a detection device of the present invention.

The three dimensional camera 14 is, for example, a camera including a projection unit that projects a pattern on a subject, and an imaging unit that images the subject on which the pattern is projected. The three dimensional camera 14 acquires three dimensional information of a workpiece 24 placed on a table 20 as shown in FIGS. 2A to 2C. Note that the three dimensional camera 14 may be a stereo camera including a plurality of imaging units. The three dimensional camera 14 is fixed to an arm 22 of the articulated robot 12 (hereinafter referred to as a robot 12). The robot 12 changes the position of the three dimensional camera 14, and the imaging direction of the three dimensional camera 14. Note that the device is not limited to the robot 12 as long as the device can change the position of the three dimensional camera 14, and the imaging direction of the three dimensional camera 14. Further, the three dimensional camera 14 may be rotatably attached to the arm 22 of the robot 12 by a mechanism provided in the three dimensional camera 14. In this case, the position of the three dimensional camera 14 is changed by the robot 12, and the imaging direction of the three dimensional camera 14 is changed by the mechanism provided in the three dimensional camera 14.

The coordinate acquisition unit 16 acquires position coordinates of the workpiece 24 in a three dimensional space, from the three dimensional information of the workpiece 24 acquired by the three dimensional camera 14. Acquisition of the position coordinates will be described in detail later.

The imaging control unit 18 controls the position of the three dimensional camera 14, and the imaging direction of the three dimensional camera 14. The imaging control unit 18 outputs, to a robot control device 26, a command value for the position of the three dimensional camera 14, and a command value for the imaging direction of the three dimensional camera 14. The robot control device 26 controls the robot 12 based on the command values input from the imaging control unit 18, to change the position of the three dimensional camera 14 and the imaging direction of the three dimensional camera 14.

The position detection device 10 includes a computer including an arithmetic processing unit and a storage (not shown). The arithmetic processing unit includes, for example, a processor such as a central processing unit (CPU) or a micro processing unit (MPU), and a memory including a non-transitory tangible computer-readable recording medium such as a ROM or a RAM. The storage is a non-transitory tangible computer-readable recording medium such as a hard disk or a solid-state drive (SSD). The coordinate acquisition unit 16 and the imaging control unit 18 are realized by, for example, the arithmetic processing unit executing a program stored in the storage.

[Acquisition of Position Coordinates of Workpiece]

The coordinate acquisition unit 16 acquires the position coordinates of the workpiece 24 in the three dimensional space, based on the three dimensional information acquired by the three dimensional camera 14, the information about the position of the three dimensional camera 14, and the information about the imaging direction of the three dimensional camera 14. The information about the position of the three dimensional camera 14 and the information about the imaging direction of the three dimensional camera 14 can be obtained from the command value for the position of the three dimensional camera 14 and the command value for the imaging direction of the three dimensional camera 14, which are output to the robot control device 26 by the imaging control unit 18. The information about the position of the three dimensional camera 14 and the information about the imaging direction of the three dimensional camera 14 may be obtained from position information of a tip of the arm 22 of the robot 12, and posture information of the robot 12. The position information of the tip of the arm 22 of the robot 12 and the posture information of the robot 12 are obtained from the robot control device 26.

The position detection device 10 of the present embodiment can detect the positions of both ends of the long workpiece 24. Further, the position detection device 10 can detect a midpoint of the long workpiece 24 in the axial direction thereof. The workpiece 24 corresponds to a long workpiece of the present invention.

Figure 3:
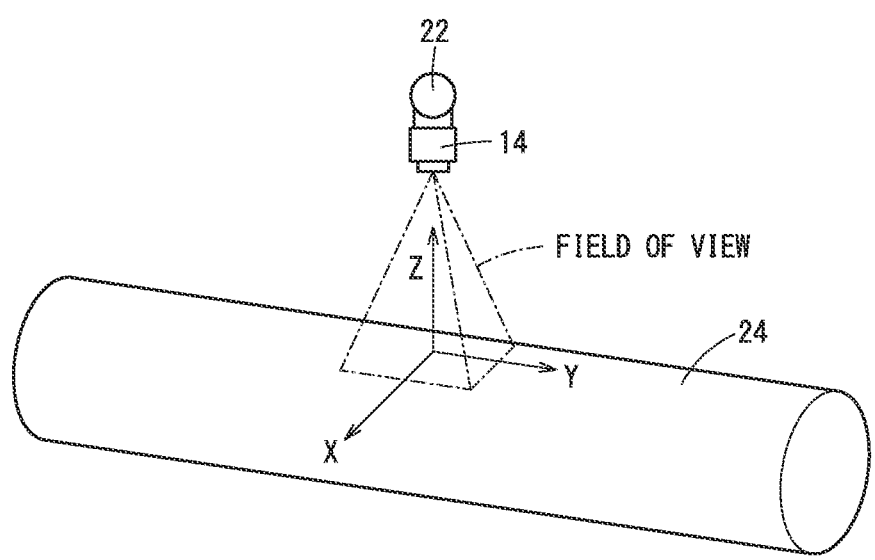
FIG. 3 is a diagram explaining a method for acquiring position coordinates of a workpiece.

FIG. 3 is a diagram explaining a method for acquiring the position coordinates of the workpiece 24. The imaging control unit 18 controls the position of the three dimensional camera 14 to be above the workpiece 24 in the vertical direction (gravity direction). The imaging control unit 18 controls the imaging direction of the three dimensional camera 14 to be downward in the vertical direction. The coordinate acquisition unit 16 sets a workpiece coordinate system based on the three dimensional information of the workpiece 24 acquired by the three dimensional camera 14, the information about the position of the three dimensional camera 14, and the information about the imaging direction of the three dimensional camera 14.

Figure 4A:
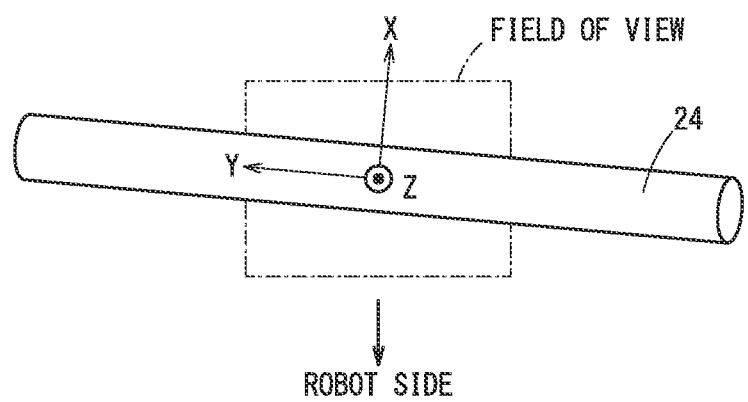
FIGS. 4A and 4B are diagrams each explaining a method for setting a workpiece coordinate system.
Figure 4B:
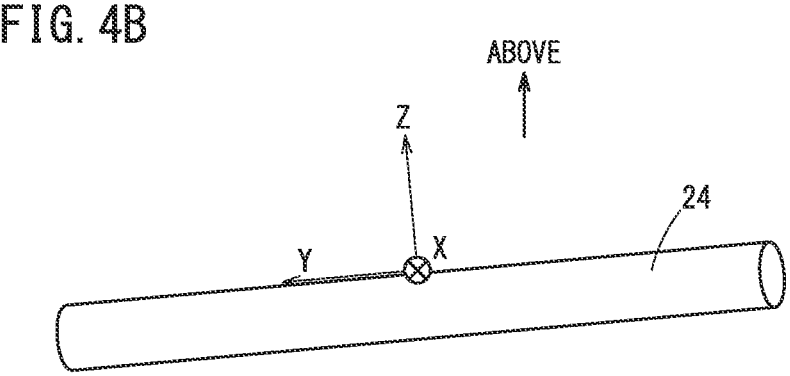

FIGS. 4A and 4B are diagrams each explaining a method for setting the workpiece coordinate system. FIG. 4A is a top perspective view of the workpiece 24. FIG. 4B is a side perspective view of the workpiece 24.

As shown in FIGS. 4A and 4B, in the workpiece coordinate system, a direction in which the workpiece 24 extends is set as a Y-axis direction, and a left-hand side viewed from the robot 12 side or a direction away from the robot 12 is set as a positive side. The origin in the Y-axis direction is set at the center of the workpiece 24 in the Y-axis direction within the field of view of the three dimensional camera 14. The origin in the Y-axis direction may be set at an arbitrary point on the Y-axis within the field of view of the three dimensional camera 14.

As shown in FIG. 4A, in the workpiece coordinate system, on a horizontal plane (a plane orthogonal to the vertical direction), a direction orthogonal to the Y-axis direction is set as an X-axis direction, and a direction away from the robot 12 or a right-hand side viewed from the robot 12 side is set as a positive side. The origin in the X-axis direction is set at a position where the X-axis direction and the Y-axis direction intersect with each other at the origin in the Y-axis direction.

As shown in FIGS. 4A and 4B, in the workpiece coordinate system, a direction orthogonal to the X-axis direction and the Y-axis direction is set as a Z-axis direction, and the upper side is set as a positive side.

Figure 5:
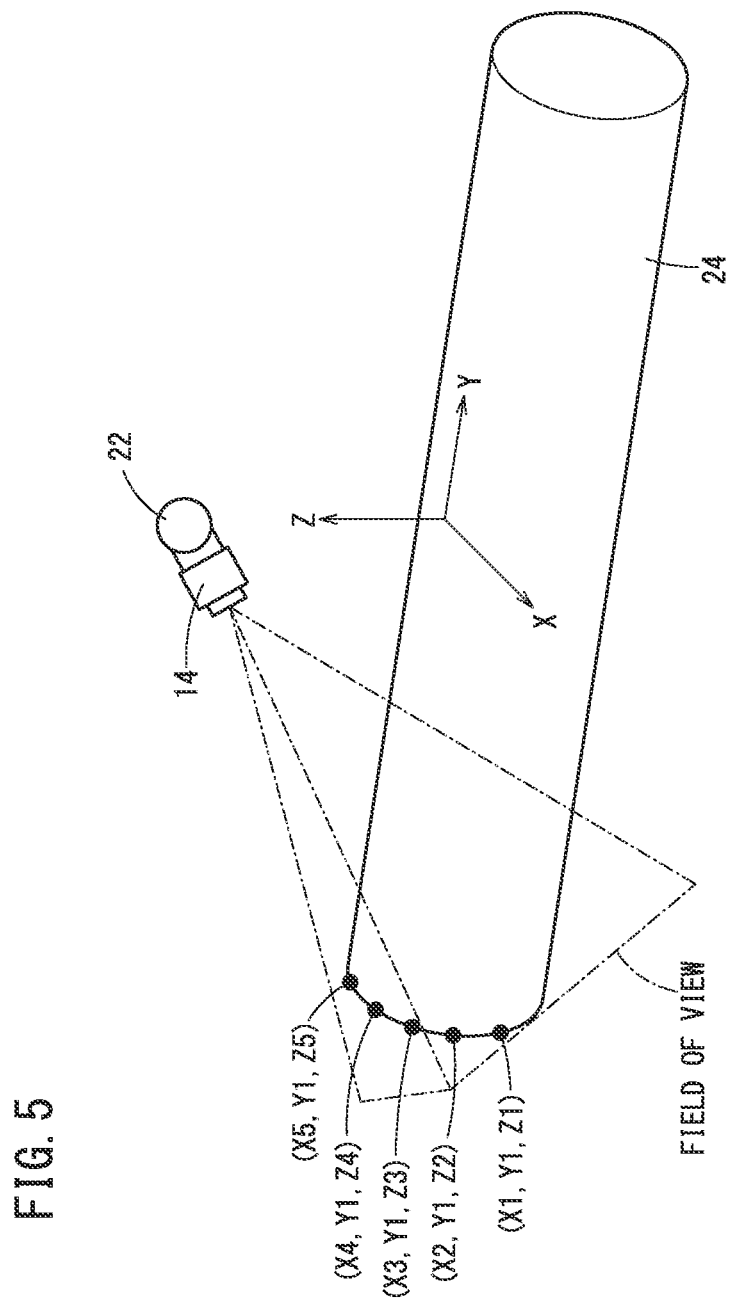
FIG. 5 is a diagram explaining a method for acquiring position coordinates of the workpiece.

FIG. 5 is a diagram explaining a method for acquiring the position coordinates of the workpiece 24. When the workpiece coordinate system is set, the imaging control unit 18 controls the imaging direction of the three dimensional camera 14 so that one end of the workpiece 24 on the negative side in the Y-axis direction enters the field of view of the three dimensional camera 14. The imaging control unit 18 controls the imaging direction of the three dimensional camera 14 based on the three dimensional information acquired by the three dimensional camera 14. As a result, the three dimensional camera 14 can acquire three dimensional information of the Y-axis direction negative side end portion of the workpiece 24.

Figure 6:
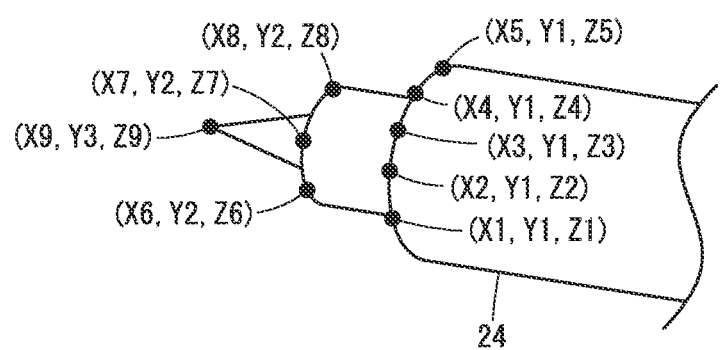
FIG. 6 is a diagram showing an example of another shape of the workpiece.

The coordinate acquisition unit 16 acquires the position coordinates of the Y-axis direction negative side end portion of the workpiece 24 in the workpiece coordinate system, from the three dimensional information of the Y-axis direction negative side end portion of the workpiece 24 acquired by the three dimensional camera 14, the information about the position of the three dimensional camera 14, and the information about the imaging direction of the three dimensional camera 14. For example, as shown in FIG. 5, focusing on Y-axis component values of the acquired position coordinates of the Y-axis direction negative side end portion of the workpiece 24, a minimum Y-axis component value Y1 is stored as Ymin. Note that, although the workpiece 24 shown in FIG. 5 has a cylindrical shape, it may have another shape. FIG. 6 is a diagram showing an example of another shape of the workpiece 24. In the case of the workpiece 24 having the shape shown in FIG. 6 as well, a minimum Y-axis component value Y3 is stored as Ymin.

Figure 7:
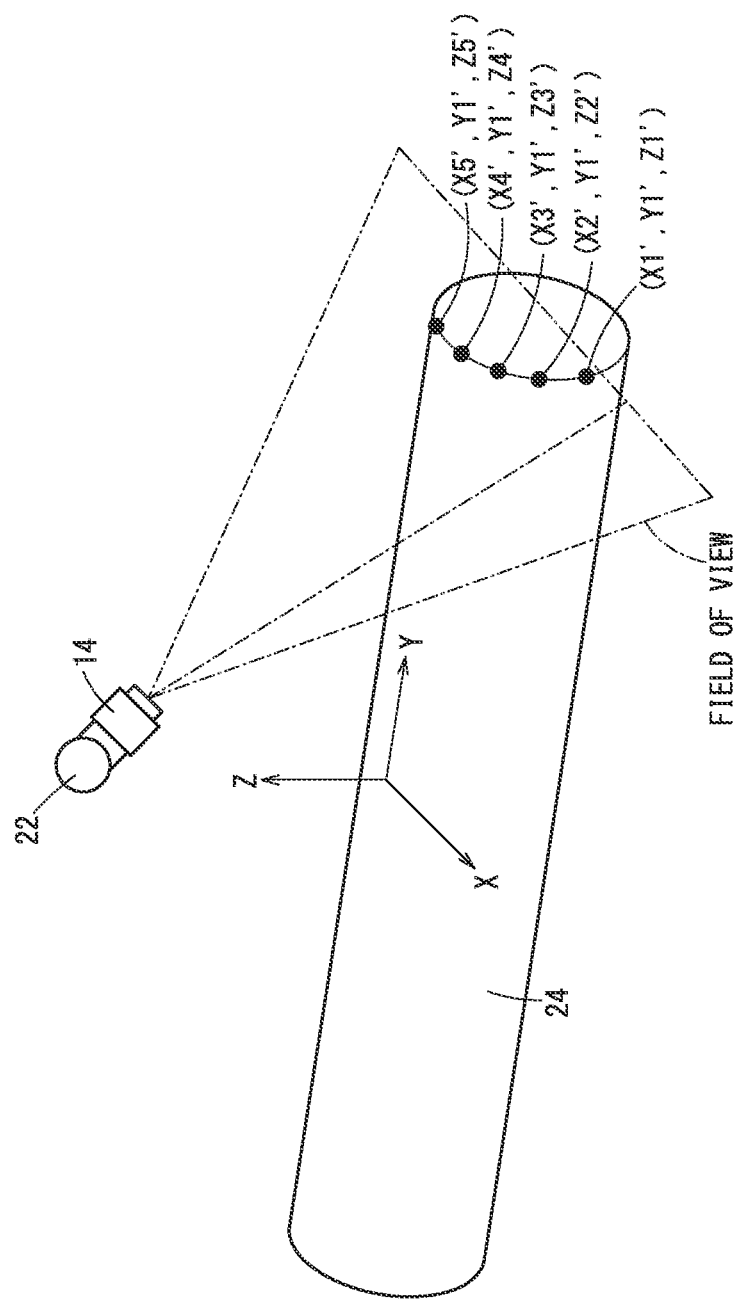
FIG. 7 is a diagram explaining a method for acquiring position coordinates of the workpiece.

FIG. 7 is a diagram explaining a method for acquiring the position coordinates of the workpiece 24. After the imaging direction of the three dimensional camera 14 is controlled so that one end of the workpiece 24 enters the field of view of the three dimensional camera 14, the imaging control unit 18 controls the imaging direction of the three dimensional camera 14 so that another end of the workpiece 24 on the positive side in the Y-axis direction enters the field of view of the three dimensional camera 14. The imaging control unit 18 controls the imaging direction of the three dimensional camera 14 based on the three dimensional information acquired by the three dimensional camera 14. As a result, the three dimensional camera 14 can acquire three dimensional information of the Y-axis direction positive side end portion of the workpiece 24.

The coordinate acquisition unit 16 acquires the position coordinates of the Y-axis direction positive side end portion of the workpiece 24 in the workpiece coordinate system, from the three dimensional information of the Y-axis direction positive side end portion of the workpiece 24 acquired by the three dimensional camera 14, the information about the position of the three dimensional camera 14, and the information about the imaging direction of the three dimensional camera 14. For example, as shown in FIG. 7, focusing on Y-axis component values of the acquired position coordinates of the Y-axis direction positive side end portion of the workpiece 24, a maximum Y-axis component value Y1' is stored as Ymax.

The coordinate acquisition unit 16 calculates the position coordinates of the midpoint of the workpiece 24 in the Y-axis direction in the workpiece coordinate system, based on the minimum Y-axis component value Ymin and the maximum Y-axis component value Ymax of the workpiece 24. The position coordinates (Xc, Yc, Zc) of the midpoint of the workpiece 24 are obtained as follows.

$$(Xc, Yc, Zc) = (0, (Y\max + Y\min)/2, 0)$$

Instead of the position coordinates of the midpoint of the workpiece 24 in the Y-axis direction in the workpiece coordinate system, the coordinate acquisition unit 16 may calculate the coordinates of an internally dividing point other than the midpoint of the workpiece 24 in the Y-axis direction in the workpiece coordinate system.

The coordinate acquisition unit 16 converts the position coordinates (Xc, Yc, Zc) of the midpoint of the workpiece 24 in the workpiece coordinate system into position coordinates in a user coordinate system used for control of the robot 12. The workpiece coordinate system corresponds to a first coordinate system of the present invention, and the user coordinate system corresponds to a second coordinate system of the present invention.

[Workpiece Position Detection Process]

Figure 8:
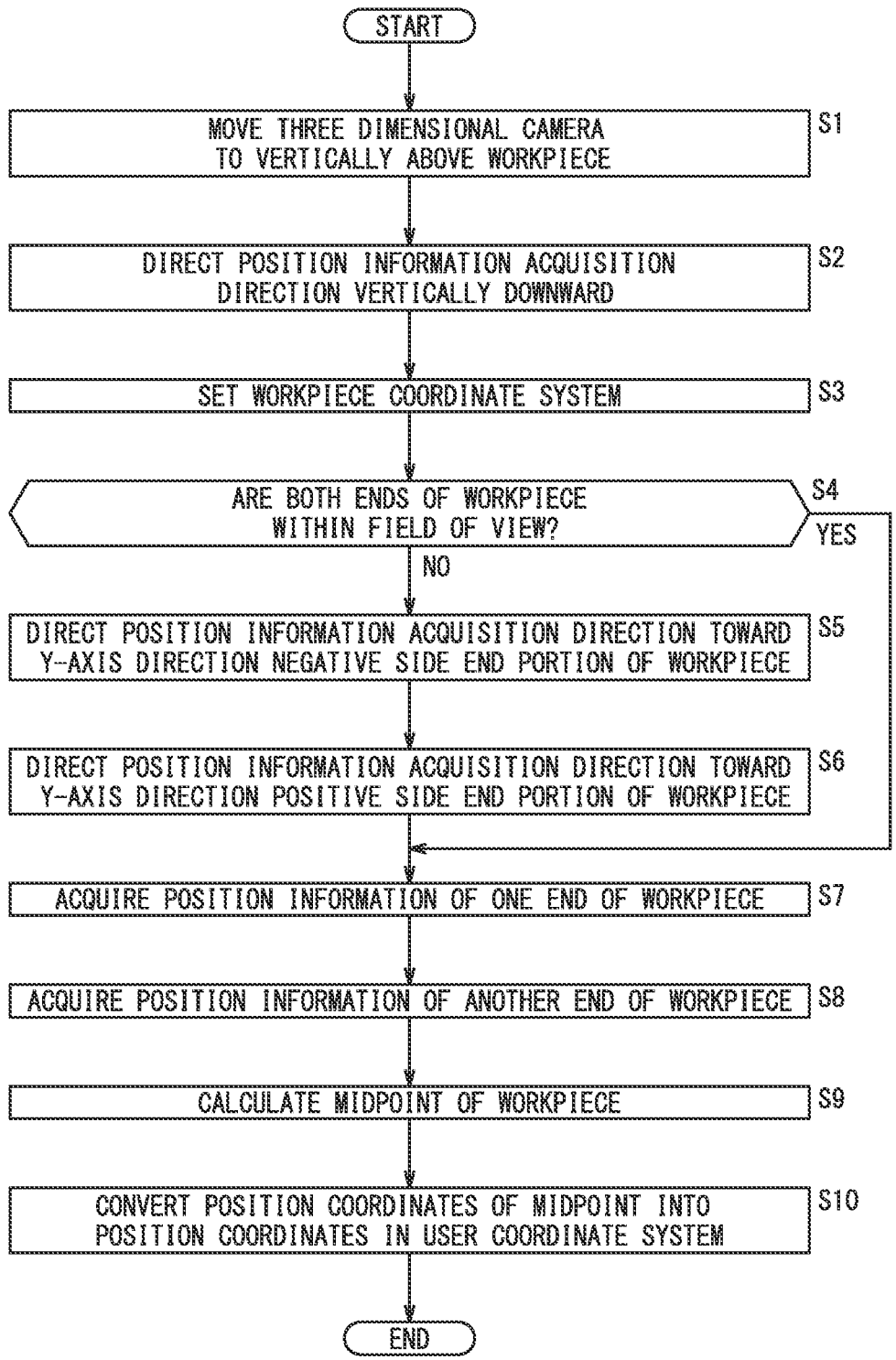
FIG. 8 is a flowchart showing a flow of a workpiece position detection process performed by the position detection device.

FIG. 8 is a flowchart showing a flow of a workpiece position detection process performed by the position detection device 10. The workpiece position detection process is executed each time a new workpiece 24 is placed on the table 20.

In step S1, the imaging control unit 18 performs control such that the three dimensional camera 14 is positioned above the workpiece 24 in the vertical direction, and the process proceeds to step S2.

In step S2, the imaging control unit 18 performs control such that the imaging direction of the three dimensional camera 14 is directed downward in the vertical direction, and the process proceeds to step S3.

In step S3, the coordinate acquisition unit 16 sets the workpiece coordinate system from the three dimensional information of the workpiece 24 acquired by the three dimensional camera 14, the information about the position of the three dimensional camera 14, and the information about the imaging direction of the three dimensional camera 14, and the process proceeds to step S4.

In step S4, the coordinate acquisition unit 16 determines whether or not both ends of the workpiece 24 are within the field of view of the three dimensional camera 14, based on the three dimensional information acquired by the three dimensional camera 14. When both ends of the workpiece 24 are within the field of view of the three dimensional camera 14 (step S4: YES), the process proceeds to step S7, and when at least one end of the workpiece 24 is not within the field of view of the three dimensional camera 14 (step S4: NO), the process proceeds to step S5.

In step S5, the imaging control unit 18 controls the imaging direction of the three dimensional camera 14 so that the Y-axis direction negative side end portion of the workpiece 24 (one end of the workpiece 24) enters the field of view of the three dimensional camera 14, and the process proceeds to step S6. The imaging control unit 18 controls the imaging direction of the three dimensional camera 14 based on the three dimensional information acquired by the three dimensional camera 14.

In step S6, the imaging control unit 18 controls the imaging direction of the three dimensional camera 14 so that the Y-axis direction positive side end portion of the workpiece 24 (the other end of the workpiece 24) enters the field of view of the three dimensional camera 14, and the process proceeds to step S7. The imaging control unit 18 controls the imaging direction of the three dimensional camera 14 based on the three dimensional information acquired by the three dimensional camera 14.

In step S7, the coordinate acquisition unit 16 acquires the Y-axis component value Ymin as the position information of the Y-axis direction negative side end portion of the workpiece 24 (one end of the workpiece 24), and the process proceeds to step S8.

In step S8, the coordinate acquisition unit 16 acquires the Y-axis component value Ymax as the position information of the Y-axis direction positive side end portion of the workpiece 24 (the other end of the workpiece 24), and the process proceeds to step S9.

In step S9, the coordinate acquisition unit 16 calculates the position coordinates of the midpoint of the workpiece 24 in the workpiece coordinate system, based on the Y-axis component value Ymin and the Y-axis component value Ymax, and the process proceeds to step S10.

In step S10, the coordinate acquisition unit 16 converts the position coordinates of the midpoint of the workpiece 24 in the workpiece coordinate system into position coordinates in the user coordinate system, and the workpiece position detection process ends.

[Operational Effect]

Figure 9:
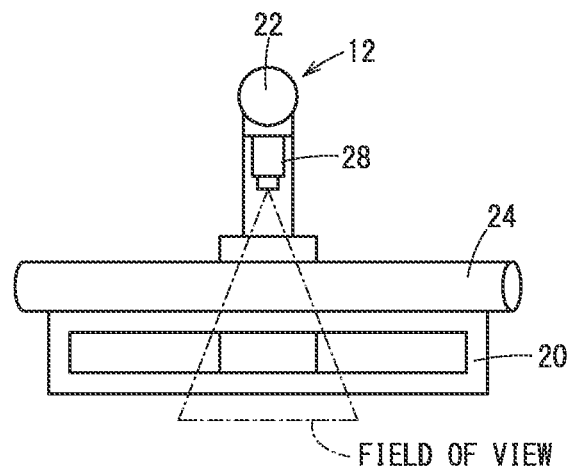
FIG. 9 is a diagram showing the robot.

The position detection device 10 of the present embodiment detects the positions of both ends of the workpiece 24 using the three dimensional information of the workpiece 24 acquired by the three dimensional camera 14. The position detection device can also detect the positions of both ends of the workpiece 24 using two dimensional information of the workpiece 24 acquired by a two dimensional camera 28 (FIG. 9). In this case, the two dimensional camera 28 needs to be installed such that the imaging direction of the two dimensional camera 28 is orthogonal to the longitudinal direction of the workpiece 24.

FIG. 9 is a diagram showing the robot 12. The two dimensional camera 28 is attached to the arm 22 of the robot 12 in the same manner as the three dimensional camera 14 of the present embodiment, and the position of the two dimensional camera 28 and the imaging direction of the two dimensional camera 28 are changed by the robot 12.

The position of the two dimensional camera 28 is moved to above the workpiece 24 in the vertical direction as shown in FIG. 9, and the posture of the two dimensional camera 28 is controlled such that the imaging direction thereof is downward in the vertical direction. Note that the workpiece 24 is placed on the table 20 such that the longitudinal direction thereof is parallel to the horizontal direction (the direction orthogonal to the vertical direction).

Figure 10A:
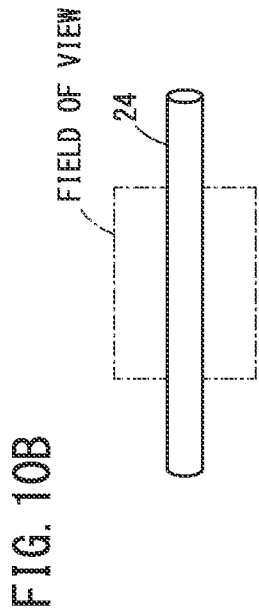
FIGS. 10A, 10B, 10C and 10D are diagrams each showing a positional relationship between the field of view of a two dimensional camera and the workpiece.
Figure 10B:
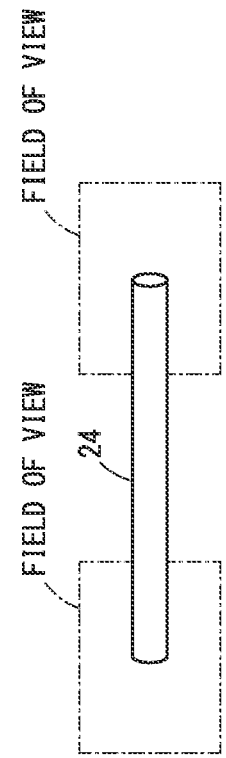

FIGS. 10A to 10D are diagrams showing a positional relationship between the field of view of the two dimensional camera 28 and the workpiece 24. For example, as shown in FIG. 10A, when one end of the workpiece 24 is positioned within the field of view of the two dimensional camera 28 but the other end is positioned outside the field of view, the two dimensional camera 28 cannot obtain two dimensional information of the other end of the workpiece 24. Further, as shown in FIG. 10B, also when both ends of the workpiece 24 are positioned outside the field of view of the two dimensional camera 28, the two dimensional camera 28 cannot obtain two dimensional information of both ends of the workpiece 24.

Figure 10C:
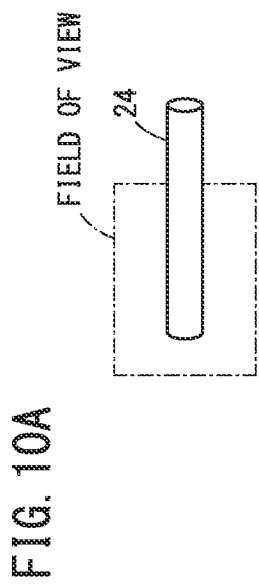
Figure 10D:
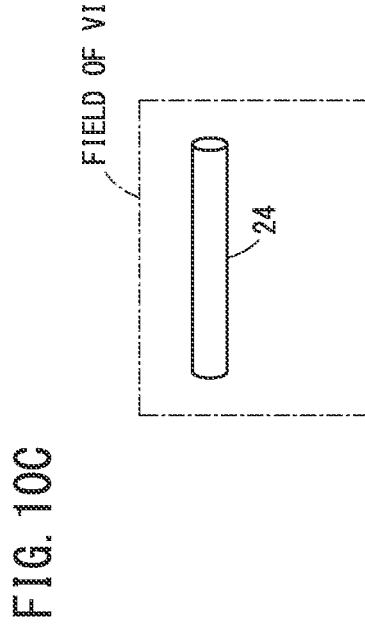

In order for the two dimensional camera 28 to obtain the two dimensional information of both ends of the workpiece 24, it is necessary to increase the distance between the two dimensional camera 28 and the workpiece 24. As a result, as shown in FIG. 10C, both ends of the workpiece 24 are positioned within the field of view of the two dimensional camera 28. Alternatively, it is necessary to move the two dimensional camera 28 so that the two dimensional camera 28 is positioned above each of one end and the other end of the workpiece 24 in the vertical direction. As a result, as shown in FIG. 10D, one end and the other end of the workpiece 24 are positioned within the field of view of the two dimensional camera 28.

Figure 11A:
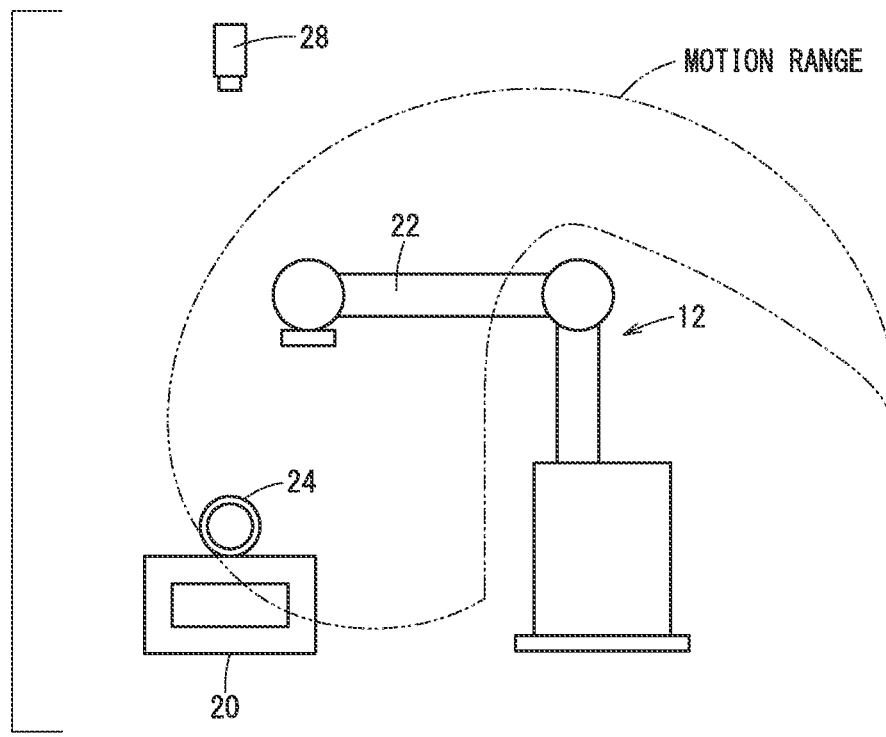
FIGS. 11A and 11B are diagrams each showing the motion range of an arm of the robot.
Figure 11B:
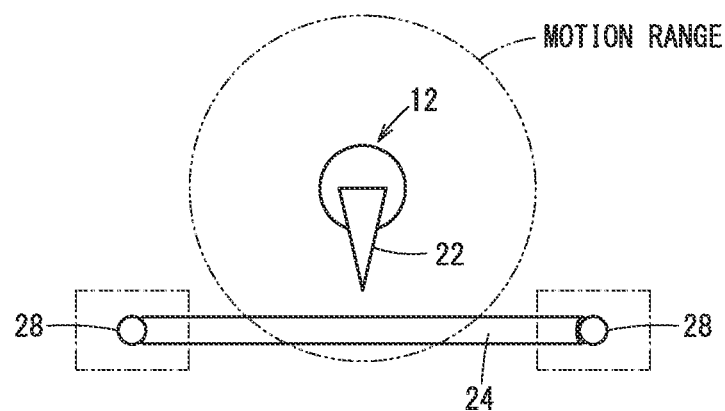

FIGS. 11A and 11B are diagrams showing the motion range of the arm 22 of the robot 12. When the two dimensional camera 28 is moved to a position away from the workpiece 24 in order to position both ends of the workpiece 24 within the field of view of the two dimensional camera 28 as shown in FIG. 10C, the position of the two dimensional camera 28 may be outside the motion range of the arm 22 of the robot 12 as shown in FIG. 11A. Further, when the two dimensional camera 28 is moved to a position above each of one end and the other end of the workpiece 24 in the vertical direction in order to position the one end and the other end of the workpiece 24 within the field of view of the two dimensional camera 28 as shown in FIG. 10D, the position of the two dimensional camera 28 may be outside the motion range of the arm 22 of the robot 12 as shown in FIG. 11B.

As described above, whether the positions of both ends of the workpiece 24 can be detected using the two dimensional information of the workpiece 24 acquired by the two dimensional camera 28 depends on the motion range of the arm 22 of the robot 12. In addition, even when the positions of both ends of the workpiece 24 can be detected by moving the two dimensional camera 28 within the motion range of the arm 22 of the robot 12, it takes time to move the two dimensional camera 28, and therefore, there is a problem that it takes a long time to detect the positions of both ends of the workpiece 24.

Therefore, in the position detection device 10 of the present embodiment, the position of the workpiece 24 is detected using the three dimensional information of the workpiece 24 acquired by the three dimensional camera 14. The imaging control unit 18 controls the imaging direction of the three dimensional camera 14 so that one end of the workpiece 24 enters the field of view of the three dimensional camera 14, and then controls the imaging direction of the three dimensional camera 14 so that the other end of the workpiece 24 enters the field of view of the three dimensional camera 14. The coordinate acquisition unit 16 acquires the position coordinates of one end of the workpiece 24 from the three dimensional information of the one end of the workpiece 24 acquired by the three dimensional camera 14, and acquires the position coordinates of the other end of the workpiece 24 from the three dimensional information of the other end of the workpiece 24 acquired by the three dimensional camera 14. As a result, the position detection device 10 can detect the positions of both ends of the long workpiece 24. Further, the position detection device 10 can detect the positions of both ends of the workpiece 24 in a short time.

In the position detection device 10 of the present embodiment, the coordinate acquisition unit 16 calculates the position coordinates of the midpoint of the workpiece 24 in the longitudinal direction thereof, based on the position coordinates of one end of the workpiece 24 and the position coordinates of the other end of the workpiece 24. As a result, the position detection device 10 can detect the position of the midpoint of the long workpiece 24 in the longitudinal direction thereof.

In the position detection device 10 of the present embodiment, the coordinate acquisition unit 16 calculates the position coordinates of the midpoint of the workpiece 24 in the longitudinal direction thereof in the workpiece coordinate system in which the longitudinal direction of the workpiece 24 is the Y-axis direction, and converts the calculated position coordinates of the midpoint into the position coordinates in the user coordinate system used for control of the robot 12. As a result, the position detection device 10 can detect the position of the midpoint of the workpiece 24 in the longitudinal direction thereof in the user coordinate system.

[Technical Concepts Obtainable from Embodiment]

The present invention provides the detection device (10) that detects the position of the long workpiece (24), the detection device including: the three dimensional camera (14) which is configured to acquire the three dimensional information, and the imaging direction of which is configured to be changed; the imaging control unit (18) configured to control the imaging direction of the three dimensional camera; and the coordinate acquisition unit (16) configured to acquire the position coordinates of the long workpiece from the three dimensional information acquired by the three dimensional camera, wherein the imaging control unit changes the imaging direction of the three dimensional camera so that one end of the long workpiece enters the field of view of the three dimensional camera, and then changes the imaging direction of the three dimensional camera so that another end of the long workpiece enters the field of view of the three dimensional camera, and the coordinate acquisition unit acquires the position coordinates of the one end from the three dimensional information of the one end acquired by the three dimensional camera when the imaging direction of the three dimensional camera is changed so that the one end enters the field of view of the three dimensional camera, and acquires the position coordinates of the other end from the three dimensional information of the other end acquired by the three dimensional camera when the imaging direction of the three dimensional camera is changed so that the other end enters the field of view of the three dimensional camera.

In the above-described detection device, the coordinate acquisition unit may calculate the position coordinates of the internally dividing point of the long workpiece in the longitudinal direction thereof, based on the position coordinates of the one end and the position coordinates of the other end.

In the above-described detection device, the coordinate acquisition unit may calculate the position coordinates of the midpoint of the long workpiece in the longitudinal direction thereof.

In the above-described detection device, the long workpiece may be a workpiece gripped by the robot (12), and the coordinate acquisition unit may calculate the position coordinates of the internally dividing point in the first coordinate system in which at least the longitudinal direction of the long workpiece is set as the coordinate axis direction, and convert the position coordinates of the internally dividing point in the first coordinate system into the position coordinates in the second coordinate system used for control of the robot.

In the above-described detection device, the three dimensional camera may be fixed to the arm (22) of the robot, or may be rotatably held by the arm in a manner so that the imaging direction is changed.

The present invention provides the detection method for detecting the position of the long workpiece based on three the dimensional information acquired by the three dimensional camera, the detection method including: the imaging step of acquiring the three dimensional information by changing the imaging direction of the three dimensional camera so that one end of the long workpiece enters the field of view of the three dimensional camera and then acquiring the three dimensional information by changing the imaging direction of the three dimensional camera so that another end of the long workpiece enters the field of view of the three dimensional camera; and the coordinate acquisition step of acquiring the position coordinates of the one end from the three dimensional information of the one end acquired by the three dimensional camera when the imaging direction of the three dimensional camera is changed so that the one end enters the field of view of the three dimensional camera, and acquiring the position coordinates of the other end from the three dimensional information of the other end acquired by the three dimensional camera when the imaging direction of the three dimensional camera is changed so that the other end enters the field of view of the three dimensional camera.

The above-described detection method may further include the internally dividing point acquisition step of calculating the position coordinates of the internally dividing point of the long workpiece in the longitudinal direction thereof, based on the position coordinates of the one end and the position coordinates of the other end that are acquired in the coordinate acquisition step.

In the above-described detection method, the internally dividing point acquisition step may include calculating the position coordinates of the midpoint of the long workpiece in the longitudinal direction thereof.

In the above-described detection method, the long workpiece may be a workpiece gripped by the robot, and the internally dividing point acquisition step includes calculating the position coordinates of the internally dividing point in the first coordinate system in which at least the longitudinal direction of the long workpiece is set as the coordinate axis direction, and converting the position coordinates of the internally dividing point in the first coordinate system into the position coordinates in the second coordinate system used for control of the robot.

The invention claimed is:

1. A detection device that detects a position of a long workpiece, the detection device comprising:
  a three dimensional camera which is configured to acquire three dimensional information, and an imaging direction of which is configured to be changed;
  a processor; and
  a memory, including instructions stored thereon,
  wherein
  the three dimensional camera is configured to be fixed to a first end surface of an arm of an articulating robot causing a field of view of the three dimensional camera to be aligned with a trajectory of the arm, wherein the arm of the articulating robot is configured to rotate at second end portion, and
  the long workpiece is a workpiece that only partially fits within the field of view of the three dimensional camera,
  the instructions when executed by the processor cause the detection device to:
  position the three dimensional camera on an upper side of the long workpiece in a vertical direction;
  control the imaging direction of the three dimensional camera to be downward in the vertical direction;
  set a first coordinate system where a longitudinal direction of the long workpiece is set as a coordinate axis direction, based on the three dimensional information of the long workpiece acquired by the three dimensional camera when the imaging direction of the three dimensional camera is pointed downward in the vertical direction;
  change the imaging direction of the three dimensional camera so that one end of the long workpiece enters the field of view of the three dimensional camera;
  acquire position coordinates of the one end in the first coordinate system from the three dimensional information of the one end acquired by the three dimensional camera when the imaging direction of the three dimensional camera is changed so that the one end enters the field of view;
  change the imaging direction of the three dimensional camera so that another end of the long workpiece enters the field of view of the three dimensional camera; and
  acquire position coordinates of the other end in the first coordinate system from the three dimensional information of the other end acquired by the three dimensional camera when the imaging direction of the three dimensional camera is changed so that the other end enters the field of view of the three dimensional camera.

2. The detection device according to claim 1, wherein the instructions when executed, further cause the detection device to:
calculate position coordinates of an internally dividing point of the long workpiece in a longitudinal direction thereof in the first coordinate system, based on the position coordinates of the one end and the position coordinates of the other end.

3. The detection device according to claim 1, wherein the instructions when executed, further cause the detection device to:
calculate position coordinates of a midpoint of the long workpiece in the longitudinal direction thereof in the first coordinate system, based on the position coordinates of the one end and the position coordinates of the other end.

4. The detection device according to claim 2, wherein the instructions when executed, further cause the detection device to:
calculate position coordinates of the internally dividing point in the first coordinate system and
convert the position coordinates of the internally dividing point in the first coordinate system into position coordinates in a second coordinate system used for control of the articulating robot.

5. The detection device according to claim 1, wherein
the three dimensional camera is fixed to the arm, or is rotatably held by the arm in a manner so that the imaging direction is changed.

6. A detection method for detecting a position of a long workpiece based on three dimensional information acquired by a three dimensional camera,
wherein
the three dimensional camera is configured to be fixed to a first end surface of an arm of an articulating robot causing a field of view of the three dimensional camera to be aligned with a trajectory of the arm, wherein the arm of the articulating robot is configured to rotate at second end portion, and
the long workpiece is a workpiece that only partially fits within the field of view of the three dimensional camera,
the detection method comprising:
a step of positioning the three dimensional camera on an upper side of the long workpiece in a vertical direction;
a step of controlling an imaging direction of the three dimensional camera to be downward in the vertical direction;
setting a first coordinate system where a longitudinal direction of the long workpiece is set as a coordinate axis direction, based on the three dimensional information of the long workpiece acquired by the three dimensional camera when an imaging direction of the three dimensional camera is pointed downward in the vertical direction;
a step of changing the imaging direction of the three dimensional camera so that one end of the long workpiece enters a field of view of the three dimensional camera;
a step of acquiring position coordinates of the one end in the first coordinate system from the three dimensional information of the one end acquired by the three dimensional camera when the imaging direction of the three dimensional camera is changed so that the one end enters the field of view;
a step of changing the imaging direction of the three dimensional camera so that another end of the long workpiece enters the field of view of the three dimensional camera; and
a step of acquiring position coordinates of the other end in the first coordinate system from the three dimensional information of the other end acquired by the three dimensional camera when the imaging direction of the three dimensional camera is changed so that the other end enters the field of view of the three dimensional camera.

7. The detection method according to claim 6, further comprising a step of calculating position coordinates of an internally dividing point of the long workpiece in a longitudinal direction thereof in the first coordinate system, based on the position coordinates of the one end and the position coordinates of the other end.

8. The detection method according to claim 6,
further comprising a step of calculating position coordinates of a midpoint of the long workpiece in the longitudinal direction thereof in the first coordinate system, based on the position coordinates of the one end and the position coordinates of the other end.

9. The detection method according to claim 7,
further comprising a step of converting the position coordinates of the internally dividing point in the first coordinate system into position coordinates in a second coordinate system used for control of the articulating robot.

* * * * *